US007940601B2

(12) United States Patent
Ghosh

(10) Patent No.: US 7,940,601 B2
(45) Date of Patent: May 10, 2011

(54) METHOD FOR COMPUTING AN EXACT IMPULSE RESPONSE OF A PLANE ACOUSTIC REFLECTOR AT ZERO OFFSET DUE TO A POINT ACOUSTIC SOURCE

(75) Inventor: Santi Kumar Ghosh, Andhra Pradesh (IN)

(73) Assignee: Council of Scientific & Industrial Research, New Delhi (IN)

( * ) Notice: Subject to any disclaimer, the term of this patent is extended or adjusted under 35 U.S.C. 154(b) by 557 days.

(21) Appl. No.: 11/711,469

(22) Filed: Feb. 26, 2007

(65) Prior Publication Data
US 2008/0137477 A1    Jun. 12, 2008

(30) Foreign Application Priority Data

Dec. 7, 2006 (IN) ........................................ 2626/06

(51) Int. Cl.
*G01V 1/00* (2006.01)
(52) U.S. Cl. .......................................................... 367/38
(58) Field of Classification Search .................... 367/38, 367/50, 53; 702/14, 16, 17
See application file for complete search history.

(56) References Cited

U.S. PATENT DOCUMENTS 5,852,588 A * 12/1998 de Hoop et al. .................. 367/38

OTHER PUBLICATIONS

Bleistein, N. et al, "Computational and asymptotic aspects of velocity inversion", *Geophysics*, vol. 50, No. 8, pp. 1253-1265, 1985.
Carcione, J. M. et al., "Seismic Modeling", *Geophysics*, vol. 67, No. 4, pp. 1304-1325, 2002.
Hilterman, F.J., "Amplitudes of Seismic Waves—A Quick Look", *Geophysics*, vol. 40, No. 5, pp. 745-762, 1975.

* cited by examiner

*Primary Examiner* — Jack Keith
*Assistant Examiner* — Krystine Breier
(74) *Attorney, Agent, or Firm* — DLA Piper LLP (US)

(57) ABSTRACT

Originating from a novel and an exact algebraic formula for the impulse response of a plane acoustic reflector at zero offset due to a point acoustic source the present invention provides a method for computing an exact impulse response of a plane acoustic reflector at zero offset due to a point acoustic source; and originating from the method, methods for testing and validating algorithms for numerical modeling of seismic reflection, seismic migration and seismic inversion; a method for testing the efficacy of ray-theoretical solution for a given source-reflector configuration; another method for computing zero-offset reflection response of a circular reflector at its central axis; yet another method for validating an interpretation of a reflector as a planar structure; still yet another method for estimating the seismic source-time function when the zero-offset reflection response of a plane reflector is given. Although the algebraic formula and the methods originating from it are, in a strict sense, valid for an acoustic earth and an acoustic source, these would also be of immense utility in the seismic industry where the earth is successfully approximated as an acoustic medium and a seismic source as an acoustic source.

5 Claims, 9 Drawing Sheets

METHOD FOR COMPUTING AN EXACT IMPULSE RESPONSE OF A PLANE ACOUSTIC REFLECTOR AT ZERO OFFSET DUE TO A POINT ACOUSTIC SOURCE

CROSS REFERENCE TO RELATED APPLICATION

This application is a utility application and claims the benefit under 35 USC §119(a) of India Application No. 2626/DEL/2006 filed Dec. 7, 2006. This disclosure of the prior application is considered part of and is incorporated by reference in the disclosure of this application.

BACKGROUND OF THE INVENTION

1. Field of Invention

The present invention relates to a method for computing an exact impulse response of a plane acoustic reflector at zero offset due to a point acoustic source useful for seismological applications.

A novel and an exact algebraic formula for the impulse response of a plane acoustic reflector at zero offset due to a point acoustic source underlies the method cited in the present invention. An observation at zero offset represents the case when the seismic source and the receiver are located either at the same point or arbitrarily close to each other.

2. Background and Prior Art of the Invention

Reflection seismology is a widely employed tool for exploration of hydrocarbons. The seismic exploration industry is focused on a particular type of experiment or, more precisely, a particular type of ensemble of experiments. A source of seismic energy is set off at a shallow depth near the surface of the earth and the upward scattered signal from the subsurface is recorded at an array of receiver located on the surface, relatively near the source compared to the depth of penetration of the signal into the earth. The distance from the source to a receiver is called offset. The output of the receiver is recorded from the time the source was set off. That is, the data represents the amount of time needed for a wave to travel down to a reflector of interest and back to the recording surface. Seismic data is grouped into traces, lines and surveys. A trace is an output of a receiver and a line is a group of traces, while a survey is a collection of lines from a geographical location.

The entire array, source and receivers, is moved and the experiment is repeated many times. The interval of separation between the successive experiments will be of the order of a few tens of meters, with the full set of experiments carried out along a line, which is a few kilometers to a few tens of kilometers in length, or even an areal array whose sides are of those dimensions. In a widely used processing step, data for coincident source and receiver is synthesized from the small offset data of the ensemble of experiments. This is achieved by time-shifting the data of each small offset experiment to approximate the arrival time that would occur, if the experiment had been a backscatter experiment at the midpoint between the source and the receiver, simulating a zero-offset condition. There are a number of positive consequences of this synthesis. For example, there would be many experiments in the ensemble whose sources and receivers will share a common midpoint. By adding (stacking) all of these together with proper time-shift for each of them, one accomplishes a noise reduction. The process is called common midpoint stacking.

The information appearing on a single seismic trace does not allow one to determine the time-spatial position of the reflecting point. Each reflection event will show up as if it occurred directly beneath the recording point. It is possible, however, to make use of the apparent dips on the seismic record section, which is the collection of all the traces in a line, to estimate the true locations of the subsurface reflections. The process which restores a reflector's true subsurface position is called migration. A related process called inversion converts seismic data to the subsurface earth properties. The purpose of inversion is to replace the time-dependence of the input data with a depth-dependence. After inversion the position of a peak on a trace indicates at what depth there is a change in the wavespeed, while the amplitude of the peak relates to the magnitude of that change.

The migration and inversion algorithms used in the seismic industry assume the earth to be an acoustic medium, as assumed in the present invention.

Reference may be made to Cagniard (1939) wherein the author obtained an algebraic formula for the response of a reflector due to a line source possessing temporal variation of a Heaviside function. One drawback of the formula is that a line source is of infinite spatial extent and does not represent real seismic sources. Another drawback is that the formula is not explicit in that the solution requires, for each elapsed time, since the onset of the source, calculation of the corresponding horizontal wave slowness, which in turn yields the value of the conforming vertical slowness required in the algebraic formula. One more drawback is that this algebraic formula, unlike the algebraic formula underlying the present invention, does not have a specific term representing the asymptotic (ray-theoretical) solution.

Reference may be made to deHoop (1960) who extended the result of Cagniard (1939) to obtain an exact solution for the reflection response of a reflector due to a point source. One drawback is that the solution, unlike the algebraic formula underlying the present invention, can be stated not as an explicit algebraic expression enabling exact computation, but rather as a single finite integral that must be evaluated by numerical means entailing approximations. Another drawback is that the solution, unlike the algebraic formula of the present invention, does not have a specific term representing the asymptotic solution.

Reference may be made to Aki and Richard (1980) who derived an exact solution for the reflection response of an acoustic reflector due to a point source. One drawback of the said derivation is that their solution, unlike the algebraic formula underlying the present invention, does not have a specific term representing the asymptotic solution. Another drawback is that the solution, unlike the algebraic formula underlying the present invention, can be stated not as an algebraic formula but rather as an infinite integral that must be evaluated by numerical means entailing approximations.

Reference may be made to Hilterman (1975) who claims to derive the zero-offset reflection response of a plane acoustic reflector. A particular drawback is that the solution is valid only for a rigid boundary corresponding to a reflection coefficient of unity. Further, the solution, unlike in the present invention, demonstrates no result for an arbitrary reflection coefficient. Also, it is not obvious as to what should be done to obtain the solution for a reflector with an arbitrary reflection coefficient. The foremost drawback is that the solution is incorrect in view of the following. According to Hilterman (1975) the complete wave equation solution corresponding to a zero offset is equal to the asymptotic solution for an acoustic plane reflector. This statement is in conflict with Claerbout (1985) and Aki and Richards (1980). According to Claerbout (1985) the complete wave equation solution is equal to the asymptotic solution only for a spherical reflector and never for a plane reflector. Further, according to Aki and Richards (1980) the reflected wavefield for a plane reflector has a longer tail in time domain than the incident wave, a result inconsistent with the solution of Hilterman (1975), according to which the complete wave equation response has the same time span as the incident wave. Therefore, the solution of Hilterman (1975) for the zero-offset reflection response of a plane acoustic reflector is incorrect.

OBJECTS OF THE INVENTION

The main object of the present invention is to provide a method for computing an exact impulse response of a plane acoustic reflector at zero offset due to a point acoustic source useful for seismological applications, which obviates the drawbacks as detailed above.

Another object of the present invention is to provide a reference standard, against which the zero-offset reflection response of a plane acoustic reflector computed by a seismic numerical modeling algorithm can be checked, and in case of a satisfactory agreement the algorithm can be designated as validated.

Still another object of the present invention is to provide a method for assessing the efficacy of asymptotic method for obtaining a seismic-reflection-modeling solution.

Yet another object of the present invention is to provide a method for computing exact zero-offset reflection response of a circular reflector observed at its central axis and up to a limited span of time.

Still yet another object of the present invention is to provide a method for computing accurate synthetic zero-offset reflection response of a planar reflector using which seismic migration and inversion algorithms can be tested and validated.

A further object of the present invention is to provide a method for validating interpretation of a reflector as a planar structure by comparing the observed reflection response of the reflector and the exact reflection response in accordance with the method cited in the main object.

A still further object of the present invention is to provide a method for estimating the seismic source-time function when the zero-offset reflection response of a planar reflector is given.

SUMMARY OF THE INVENTION

Accordingly, the present invention provides a method for computing an exact impulse response of a plane acoustic reflector at zero offset due to a point acoustic source, which comprises, a method for computing an exact impulse response of a plane acoustic reflector at zero offset due to a point acoustic source useful for seismological applications, a method for computing a reference standard for the zero-offset reflection response of a plane acoustic reflector against which the reflection response computed by a seismic numerical modeling algorithm can be checked; and in case of a satisfactory agreement the algorithm can be designated as validated, a method for assessing the efficacy of asymptotic method for obtaining a seismic-reflection modeling solution, a method for computing zero-offset reflection response of a circular reflector observed at its central axis and up to a limited span of time, a method for computing accurate synthetic zero-offset seismic section due to a planar reflector (dipping or horizontal) using which seismic migration and inversion algorithms can be tested and validated, a method for validating an interpretation of a reflector as a planar structure and a method for estimating the seismic source-time function when the zero-offset reflection response of a planar reflector is given.

BRIEF DESCRIPTION OF THE DRAWINGS

In the drawings accompanying this specification.

A point acoustic source is exploded at time, t=0 at height, h above the reflector. The source location coincides with the receiver location. The symbols have interpretations in accordance with Appendix I.

Figure 2:
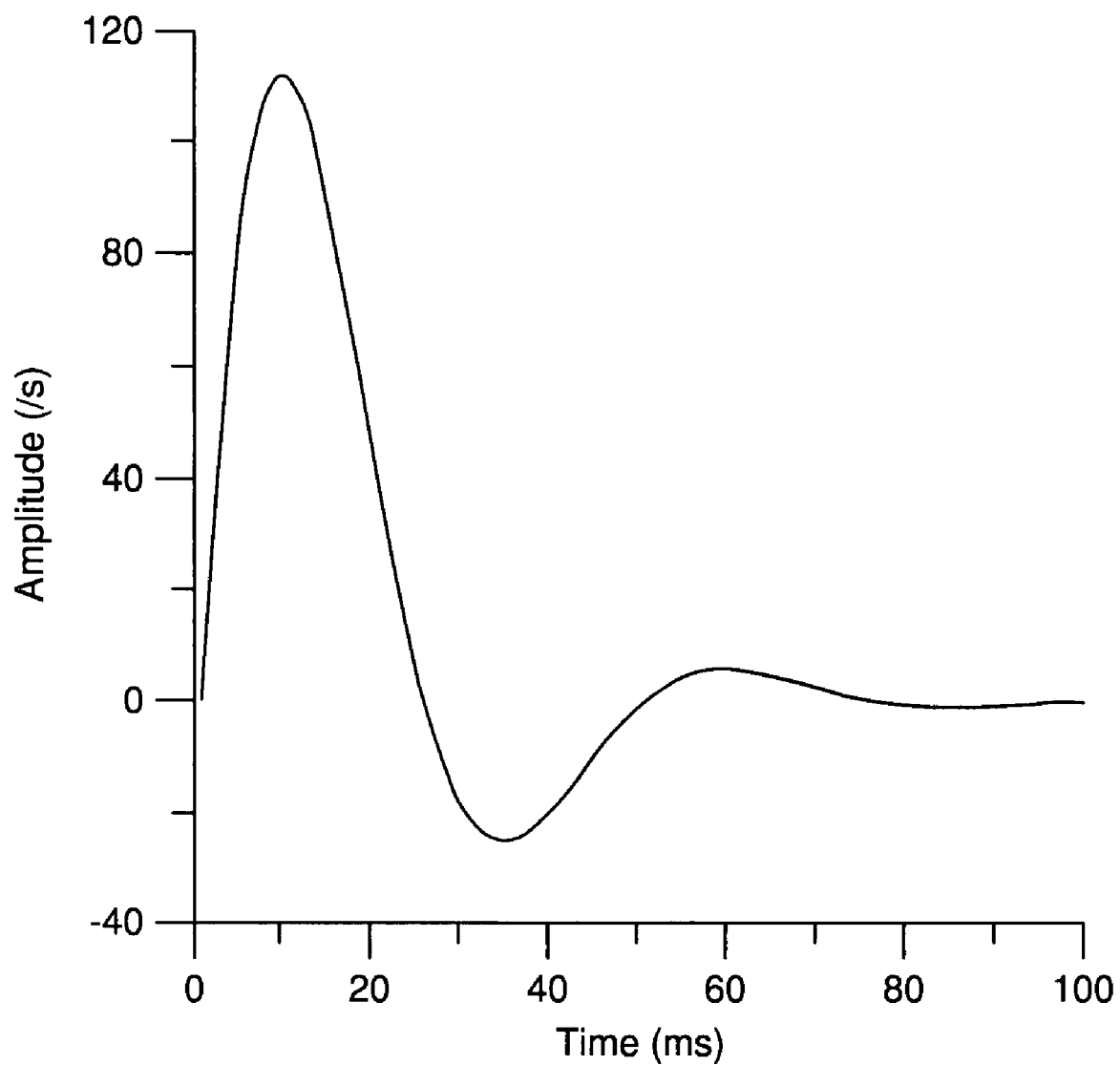

FIG. 2 represents the source-time function amplitude in/seconds plotted against time in milliseconds.

Figure 1:
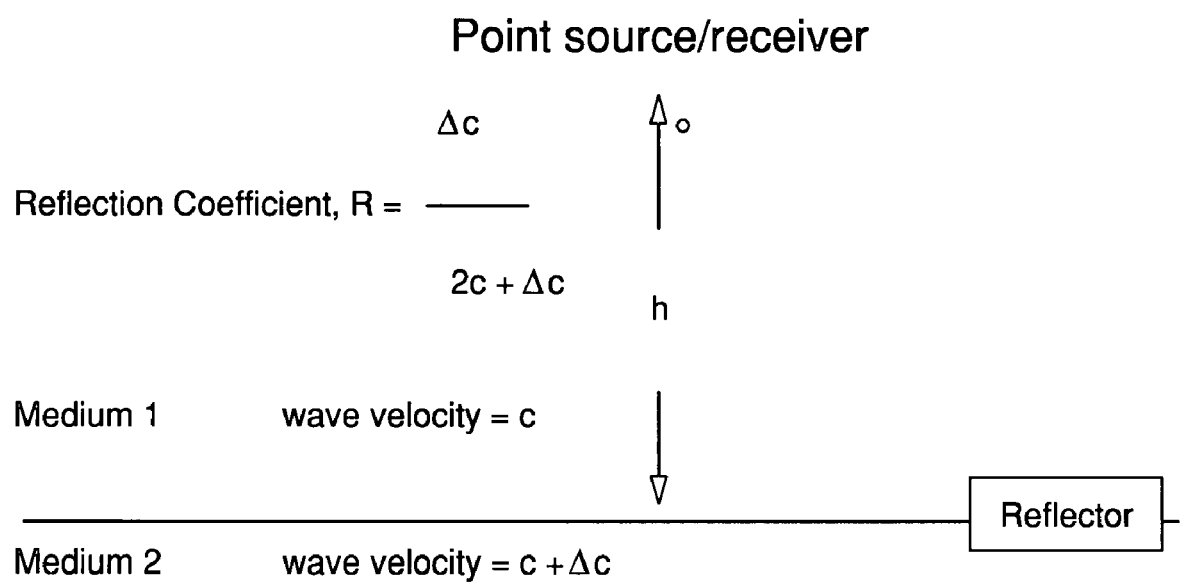
FIG. 1 represents a plane acoustic reflector consisting of an interface of two half spaces, respectively possessing sound speeds, c (upper half-space) and c+$\Delta$c (lower half-space) resulting in a reflection coefficient of $$R = \frac{\Delta c}{2c + \Delta c}$$
Figure 3:
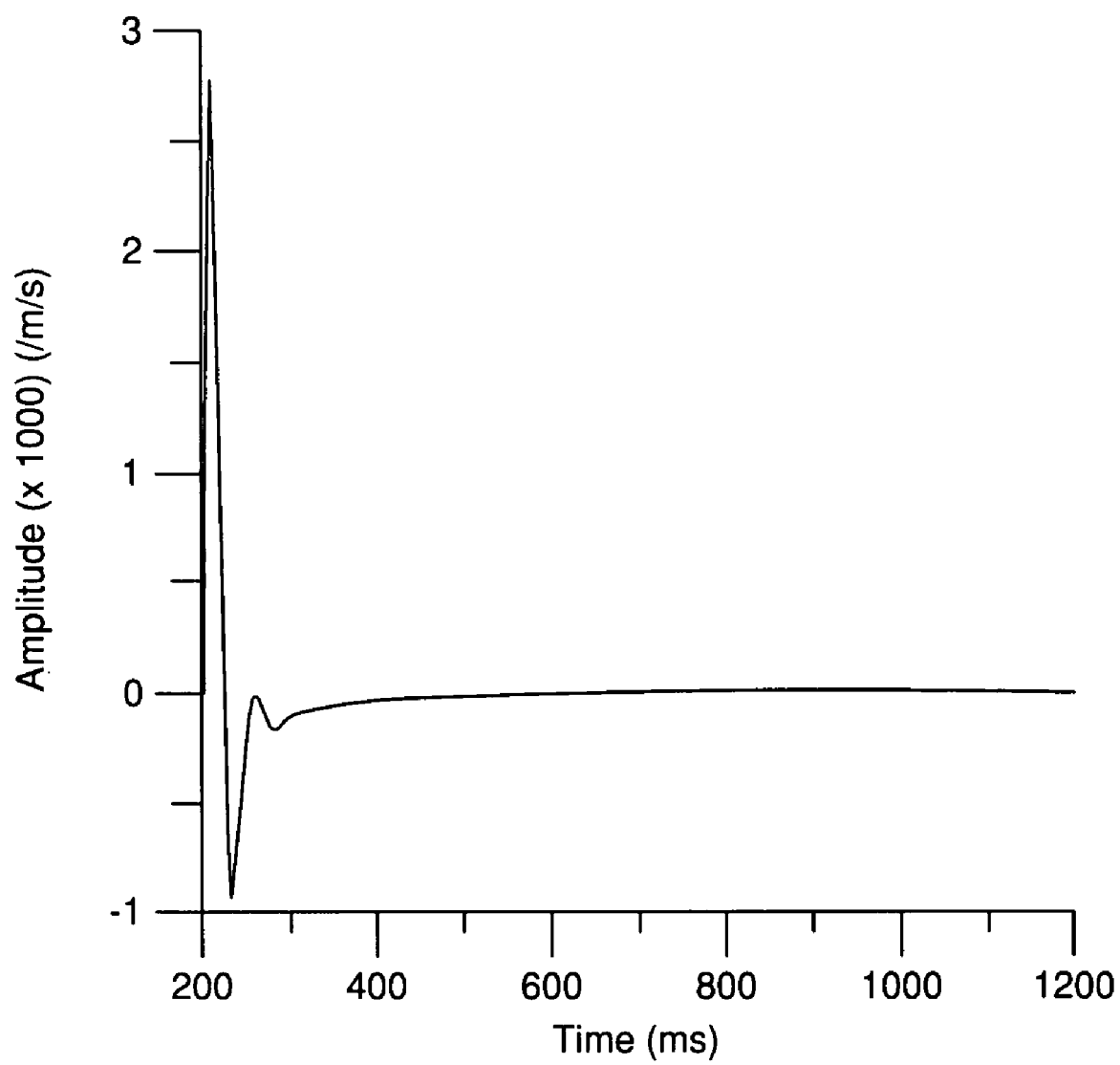

FIG. 3 represents the exact reflection response for the source function in FIG. 2 and the reflector in FIG. 1, with the specifications: c=3000 m/s, $\Delta$c=1500 m/s, h=300 m. While the ordinate represents the amplitude of response (exaggerated by 1000 times) in units of/meter/second, the abscissa represents the two-way traveltime in milliseconds. The symbols have interpretations in accordance with Appendix I.

Figure 4:
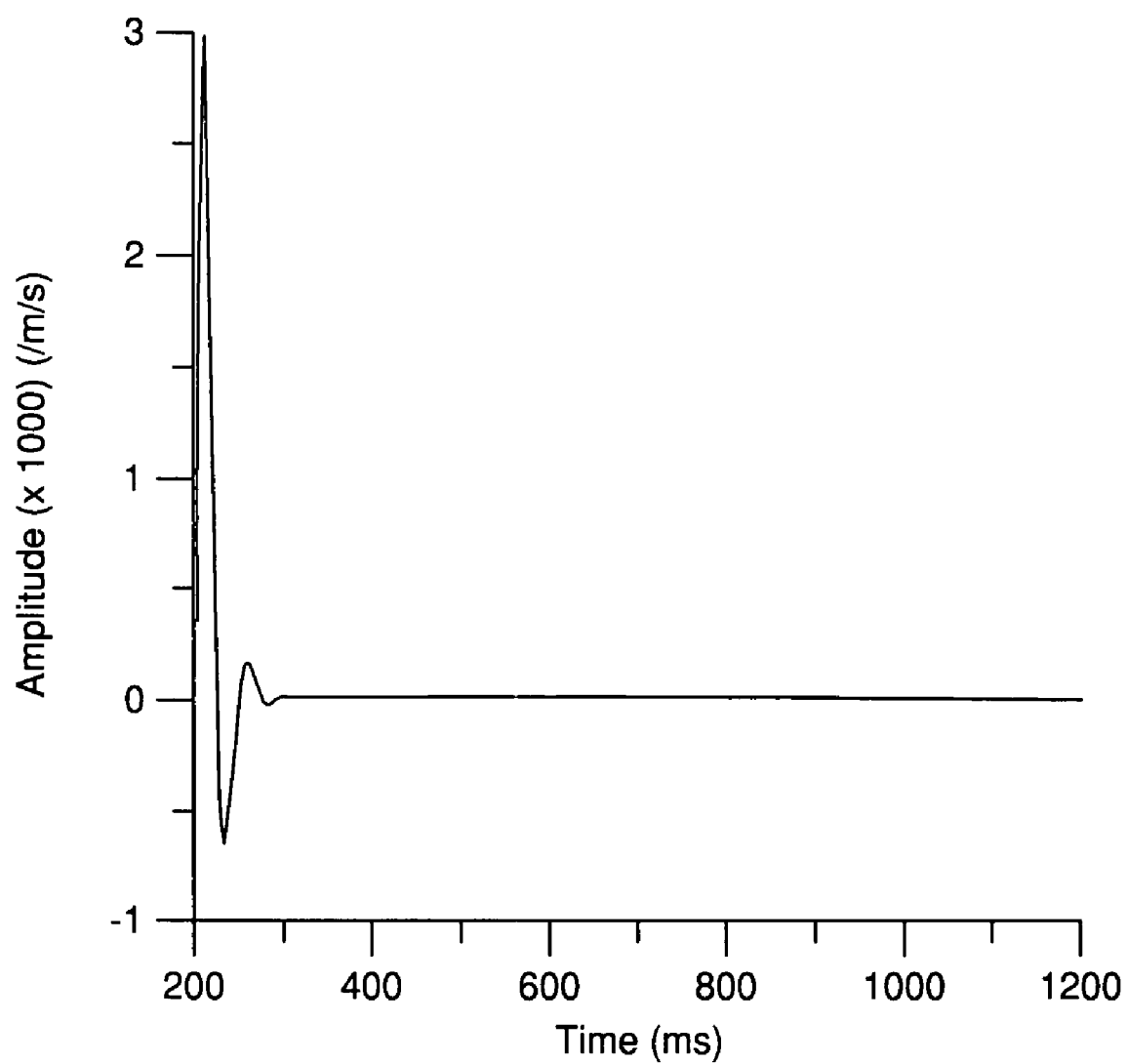

FIG. 4 represents the reflection response according to the asymptotic method for the reflection process specified in FIG. 3. Details of the plotting convention remain same as that of FIG. 3.

Figure 5:
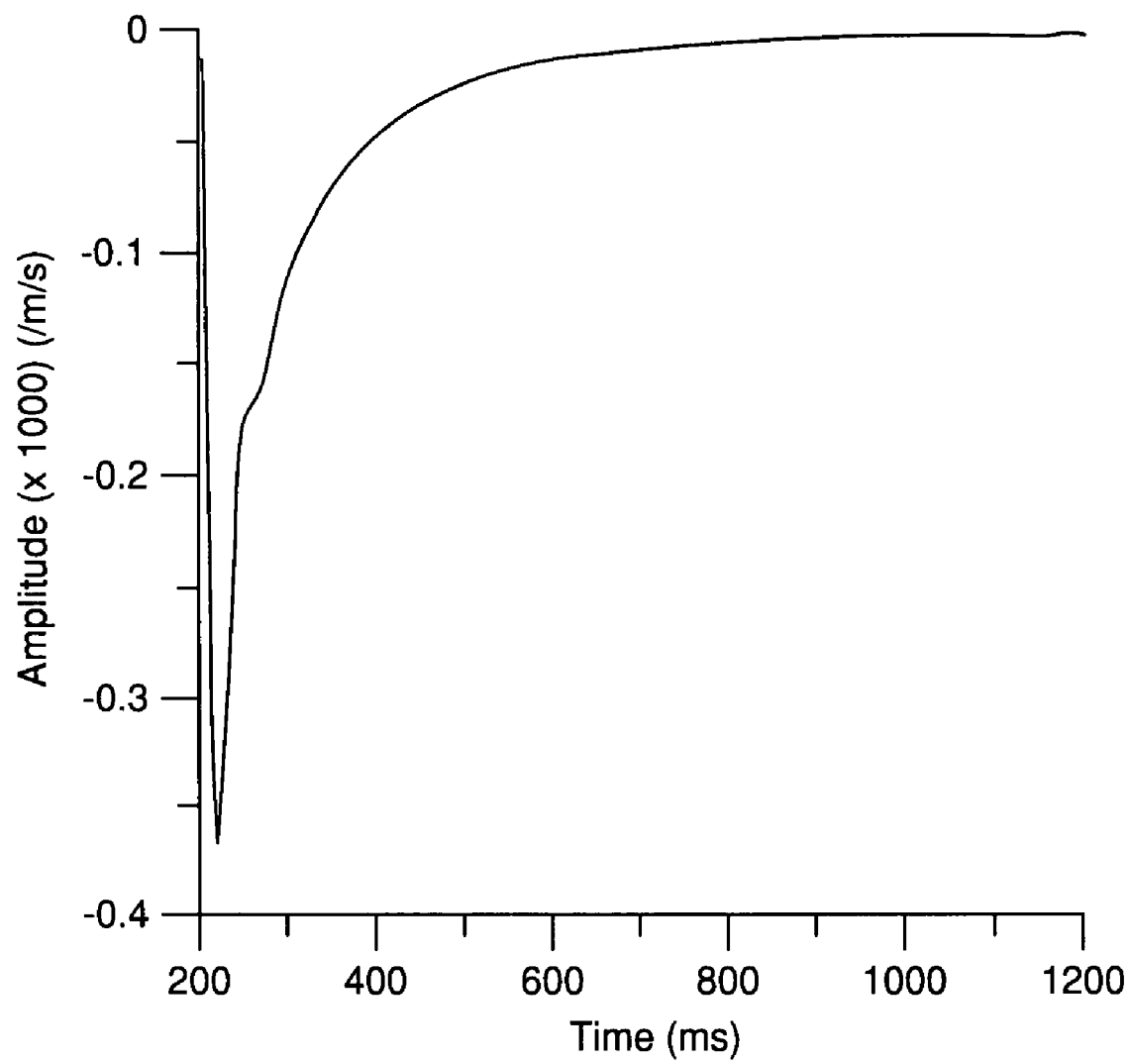

FIG. 5 represents the difference between the two reflection responses depicted respectively in FIG. 3 and FIG. 4. Details of the plotting convention remain same as that of FIG. 3.

Figure 6:
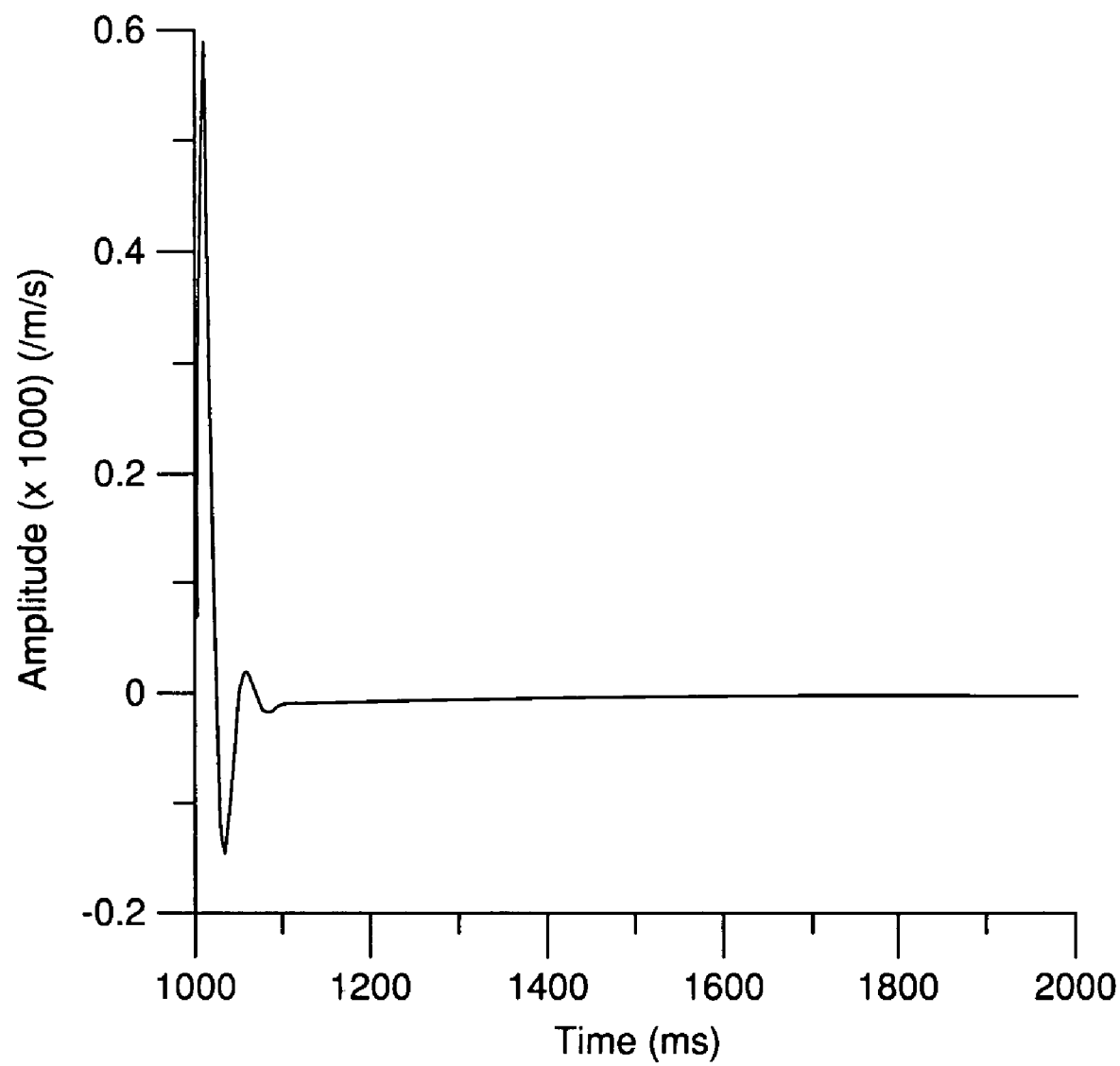

FIG. 6 represents the exact reflection response for the source function in FIG. 2 and the reflector in FIG. 1 with the specifications: c=3000 m/s, $\Delta$c=1500 m/s, h=1500 m. Details of the plotting convention remain same as before. The symbols have interpretations in accordance with Appendix I.

Figure 7:
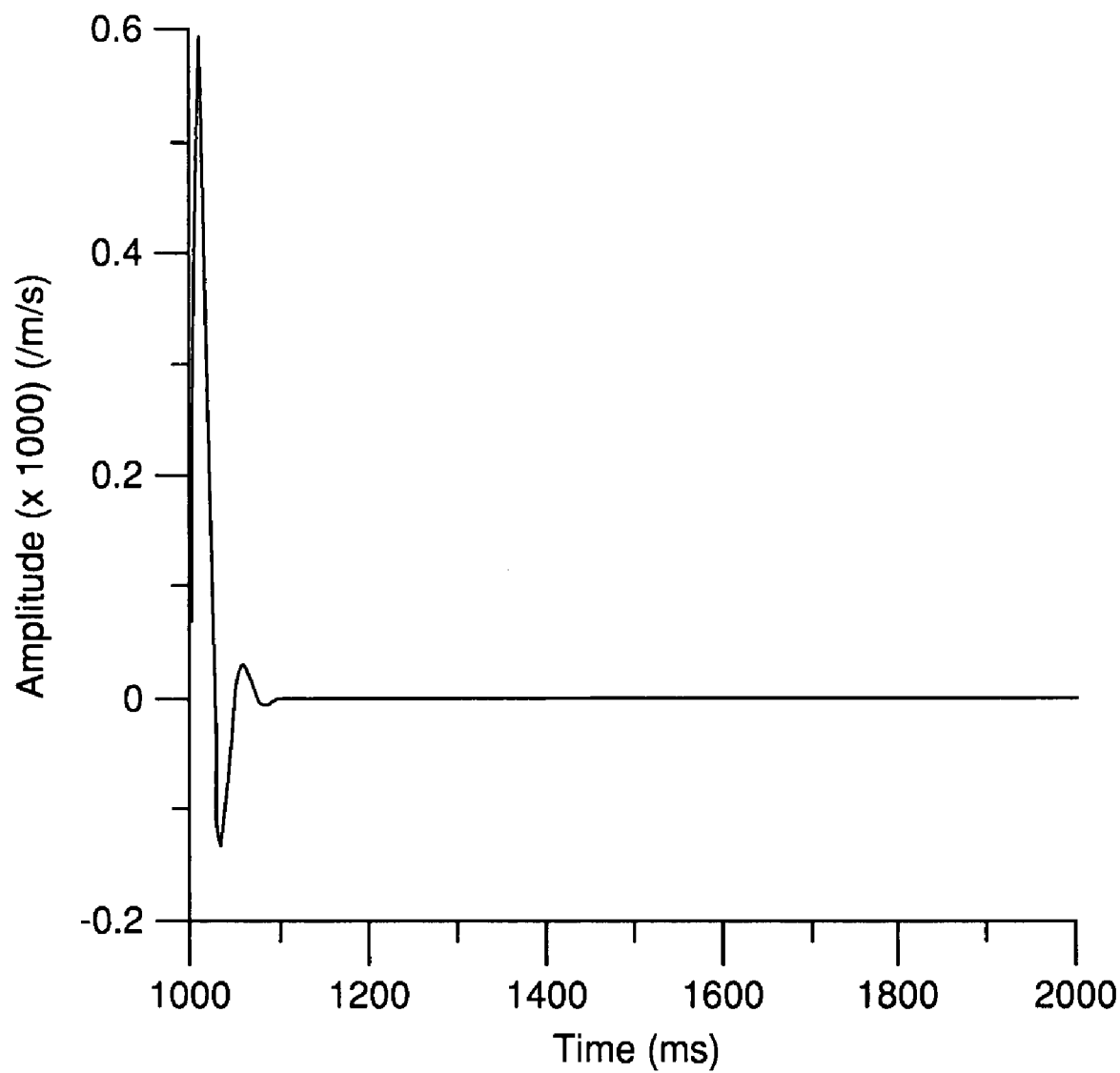

FIG. 7 represents the reflection response according to the asymptotic method for the reflection process specified in FIG. 6. Details of the plotting convention remain same as before.

Figure 8:
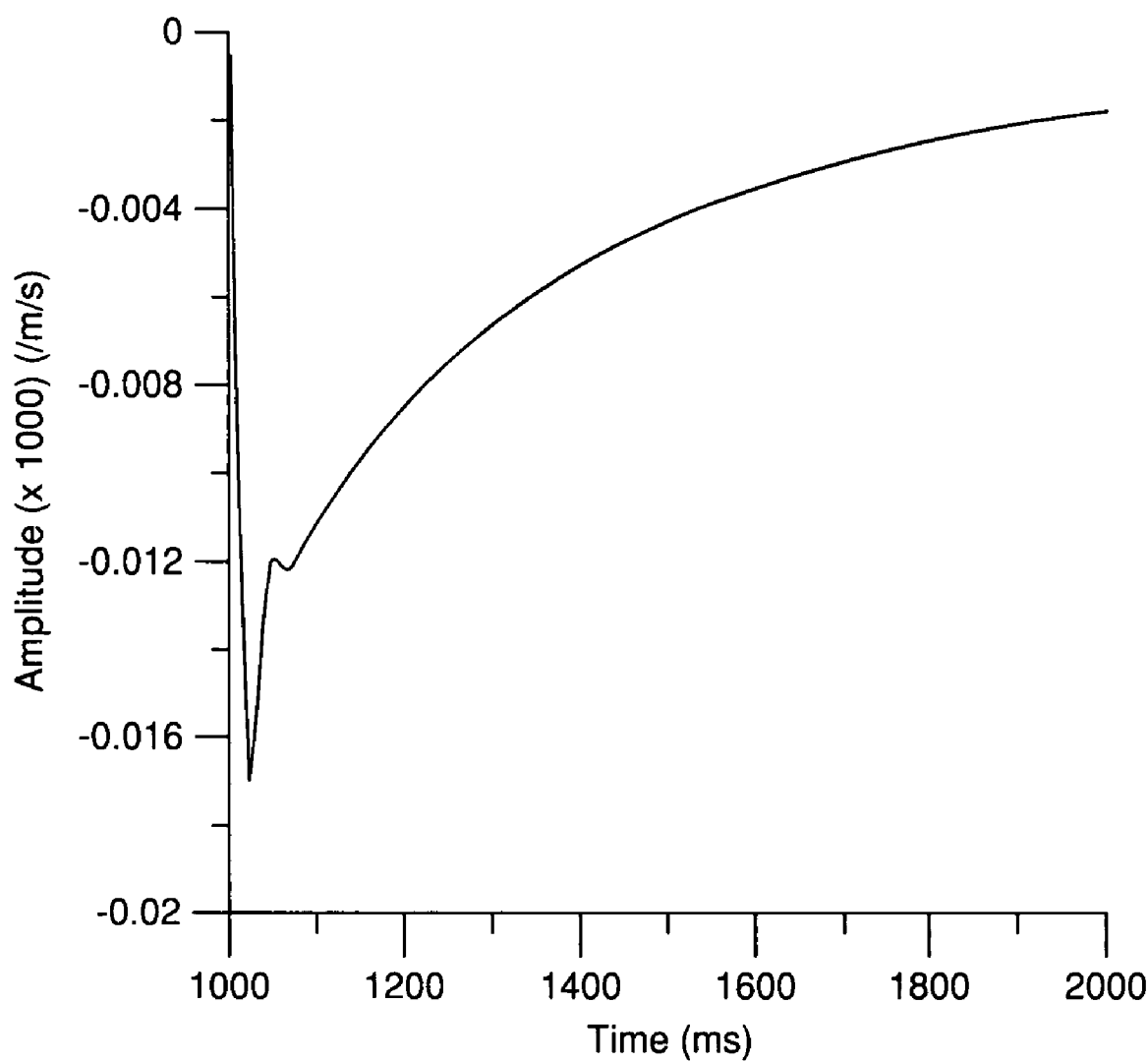

FIG. 8 represents the difference between the two reflection responses depicted respectively in FIG. 6 and FIG. 7. Details of the plotting convention remain same as before.

Figure 9:
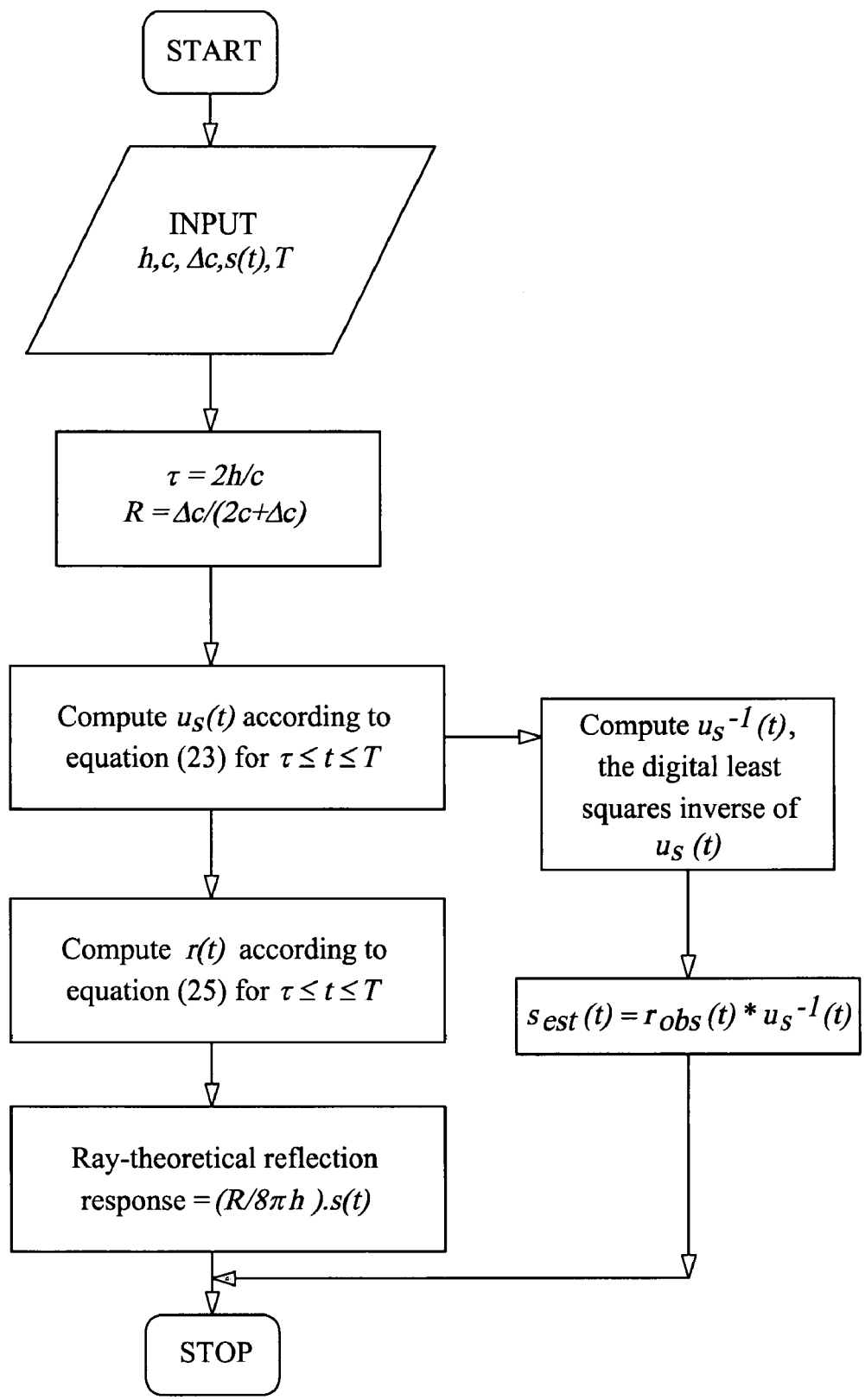

FIG. 9 represents the process flow chart.

DETAILED DESCRIPTION OF THE INVENTION

Accordingly the present invention provides a method for computing an exact impulse response of a plane acoustic reflector at zero offset due to a point acoustic source, which comprises, a method for computing an exact impulse response of a plane acoustic reflector at zero offset due to a point acoustic source useful for seismological applications, a method for computing a reference standard for the zero-offset reflection response of a plane acoustic reflector against which the reflection response computed by a seismic numerical modeling algorithm can be checked; and in case of a satisfactory agreement the algorithm can be designated as validated, a method for assessing the efficacy of asymptotic method for obtaining a seismic-reflection modeling solution, a method for computing zero-offset reflection response of a circular reflector observed at its central axis and up to a limited span of time, a method for computing accurate synthetic zero-offset seismic section due to a planar reflector (dipping or horizontal) using which seismic migration and inversion algorithms can be tested and validated, a method for validating an interpretation of a reflector as a planar structure, and a method for estimating the seismic source-time function when the zero-offset reflection response of a planar reflector is given.

In an embodiment of the present invention an exact algebraic formula is provided for the impulse response of a plane acoustic reflector at zero offset due to a point acoustic source.

In another embodiment of the present invention a method is provided for computing a reference standard for the zero-offset reflection response of a plane acoustic reflector against which the reflection response computed by a seismic numerical modeling algorithm can be checked and in case of a satisfactory agreement the algorithm can be designated as validated.

In yet another embodiment of the present invention a method is provided for assessing the efficacy of the asymptotic method for obtaining a seismic-reflection modeling solution.

In still another embodiment of the present invention, a method is provided for computing zero-offset reflection response of a circular reflector observed at its central axis and up to a limited span of time.

In still yet another embodiment of the present invention, a method is provided for computing accurate synthetic zero-offset seismic section due to a planar reflector (dipping or horizontal) using which seismic migration and inversion algorithms can be tested and validated.

In further embodiment of the present invention, a method is provided for validating an interpretation of a reflector as a planar structure.

In still further embodiment of the present invention, a method is provided for estimating the seismic source-time function when the zero-offset reflection response of a planar reflector is given.

In still further embodiments of the present invention, the methods described in the previous embodiments remain practically valid for an elastic reflector and a seismic source.

Various mathematical symbols figuring in the following are explained in Appendix I.

Bleistein (1984) and Bleistein et al. (1985) report an acoustic inversion result that yields the 3-D velocity function when the zero-offset reflection response is available at each point on the surface of the earth. This general result can be readily specialized to an inversion equation for a 1-D earth and more specifically to the inversion equation for an earth involving a single planar reflector. A significant aspect of the breakthrough leading to the present invention lies in viewing this inversion equation from a reverse perspective, i.e., in viewing the relation as yielding the reflection response when the velocities separating the reflector are known. The steps leading to an exact formula involve an exact evaluation of an integral by clever uses of established results involving Fourier transform and then removing the restriction of Born approximation common to Bleistein (1984) and Bleistein et al. (1985) by a recourse to ray-theoretical results.

In Bleistein (1984) and Bleistein et al. (1985) the earth is assumed to be an acoustic medium of constant density with only the sound speed varying. An impulsive source is set off at each point on the surface of the earth ($x_3=0$), described by a right handed coordinate system, $x=(x_1,x_2,x_3)$, with $x_3$ assumed positive in the downward direction, into the earth. The observed field is the backscattered response due to scattering by the in-homogeneities in the earth. The problem is formulated as if there is a continuum of data in space and time. With the definition $x=(x_1,x_2,x_3)$ and $\xi=(\xi_1,\xi_2,0)$, if $u(x,t,\xi)$ is the impulse response in a single backscatter experiment at $\xi$, then this function satisfies the wave equation $$\nabla^2 u(x,t,\xi) - \frac{1}{v^2}\frac{\partial^2 u(x,t,\xi)}{\partial t^2} = -\delta(x-\xi)\delta(t), t > 0 \qquad \text{Eq. 1}$$

The objective in Bleistein (1984), Bleistein et al. (1985) and related works is to find the sound speed, $v=v(x_1,x_2,x_3)$, from observations of the ensemble of backscatter responses $u_s(\xi,t,\xi)$ when the source and receiver are coincident (the so-called zero offset case), for experiments carried out at all $\xi=(\xi_1,\xi_2,0)$.

The problem is modeled as though the medium extends to negative infinity in $x_3$. Alternatively, one could have considered the problem on $0<x_3<\infty$ and modeled the source through the boundary condition that the normal derivative be equal to $-\delta(x_1-\xi_1)\delta((x_2-\xi_2)$. The effect of this would be to rescale the incident wave to be defined later by a factor of 2 and to rescale the final answer by a factor of 4. Thus, there is no essential difference between these two models.

Fourier transformation of equation (1) leads to the Helmholtz equation $$\nabla^2 u(x;\xi;\omega) + \left(\frac{\omega^2}{v^2}\right) = -\delta(x_1-\xi_1)\delta(x_2-\xi_2)\delta(x_3). \qquad \text{Eq. 2}$$

The following conventions are used for a function $f(t)$ and its Fourier transform $f(\omega)$.

$$f(\omega) = \int_{-\infty}^{\infty} f(t)\exp(i\omega t)dt; f(t) = \frac{1}{2\pi}\int_{-\infty}^{\infty} f(\omega)\exp(-i\omega t)d\omega.$$

In this definition and later, one does not introduce a new symbol for the Fourier transform of a function but only indicates the transform by the arguments of the function). Next, $v$ is expressed in terms of a reference velocity, $c$ and a perturbation, $\alpha(x)$ according to $$v^{-2}=c^{-2}[1+\alpha(x)]. \qquad \text{Eq. 3}$$

One can now decompose the total wavefield into an incident and scattered field:

$$u(x;\xi;\omega)=u_1(x;\xi;\omega)+u_s(x;\xi;\omega), \qquad \text{Eq.4}$$

in which $u_1(x;\xi;\omega)$ is the response to the source in the unperturbed medium and satisfies $$\nabla^2 u_I + \left(\frac{\omega^2}{c^2}\right)u_I = -\delta(x_1-\xi_1)\delta(x_2-\xi_2)\delta(x_3), \qquad \text{Eq. 5}$$

while $u_s$ must then satisfy $$\nabla^2 u_S + \left(\frac{\omega^2}{c^2}\right)u_S = -\alpha(x)\left(\frac{\omega^2}{c^2}\right)[u_i+u_S]. \qquad \text{Eq. 6}$$

Using Green's function representation Bleistein (1984) and Bleistein et al. (1985) write the following integral equation relating the backscattered values $u_s(\xi; \xi; \omega)$ (observed at zero offset) to the values in the interior:

$$u_S(\xi; \xi; \omega) = \omega^2 \int_{x_3>0} \frac{\alpha(x)}{c^2} u_I(x; \xi; \sigma)[u_I(x; \xi; \omega) + u_S(x; \xi; \omega)]dV. \quad \text{Eq. 7}$$

This non-linear equation, though exact, does not directly lend itself to exact solution techniques. An approximate solution emerges on assuming that the variation $\alpha(x)$ is small. Then, it would be reasonable to expect that the scattered amplitude is small as well, on the same order, $O(\alpha(x))$. Consequently, the product $\alpha(x).u_s(x; \xi; \omega)$ is quadratic in smallness - - - $O(\alpha^2(x))$. As a first order approximation then, one can neglect the higher order terms in smallness; that is, one replaces the sum $u_I + u_s$ in equation (7) by $u_I$ alone. This strategy is called Born approximation. When the reference speed, c is constant the equation (7) can be recast into $$u_S(\xi; \xi; \omega) = \frac{\omega^2}{c^2} \int \alpha(x) u_I^2 dV. \quad \text{Eq. 8}$$

Next, Bleistein (1984) and Beistein et al. (1985) solves for $\alpha(x)$ by Fourier methods. For a 1-D earth, i.e., when the sound speed varies only along depth (the $x_3$ direction) their solution would reduce to $$\alpha(x_3) = -8c \int_{-\infty}^{\infty} \frac{\partial}{\partial \omega}\left[\frac{u_S(\omega)}{\omega^2}\right] \exp\left(2i\left(\frac{\omega}{c}\right)x_3\right) \omega d\omega, \quad \text{Eq. 9}$$

where $u_s(t)$ is the zero-offset reflection response due to an impulsive point source, measured anywhere on the surface, $x_3=0$, and $\alpha(x_3)$, the velocity perturbation profile.

Of course, $u_s(\omega)$ is the Fourier transform of $u_s(t)$. Equation (9) is the starting point of the derivation leading to the formula of the present invention, i.e., the exact impulse response of an infinite plane reflector due to a point source and measured at zero offset. The first step consists of reversing the earlier point of view and treating $u_s(\omega)$ as the unknown when $\alpha(x_3)$ is given. Next, one considers an infinite plane interface given by $x_3=h$, constituting a reflector (FIG. 1) across which the wavespeed changes from c to c+$\Delta$c and perturbation value from zero to $\alpha_0$. In other words, $\alpha(x_3)=\alpha_0 H(x_3-h)$, where H indicates the Heaviside function. Upon effecting a change of variable according to $$t = \frac{2x_3}{c},$$

equation (9) can be rewritten as $$\alpha(t) = -16c\pi \frac{1}{2\pi} \int_{-\infty}^{\infty} \frac{\partial}{\partial \omega}\left[\frac{u_S(\omega)}{\omega^2}\right] \omega \exp(-i\omega t) d\omega \quad \text{Eq. 10}$$

$$= -16c\pi \cdot \frac{1}{2\pi} \int_{-\infty}^{\infty} g(\omega) \exp(-i\omega t) d\omega,$$

where $$g(\omega) \equiv \frac{\partial}{\partial \omega}\left[\frac{u_S(\omega)}{\omega^2}\right] \cdot \omega.$$

As $$\alpha(t) = \alpha_0 H(t-\tau), \left(\tau \equiv \frac{2h}{c}\right),$$

equation (10) implies $$\frac{-\alpha_0}{16c\pi} H(t-\tau) \leftrightarrow g(\omega), \quad \text{Eq. 11}$$

where '$\leftrightarrow$' indicates that the members on the left and right sides of the symbol constitute a Fourier pair.

From Urkowitz (1983) it follows that $$H(t-\tau) \leftrightarrow \left[\frac{i}{\omega} + \pi\delta(\omega)\right] \exp(i\omega\tau). \quad \text{Eq. 12}$$

From equations (10), (11) and (12) one has $$\frac{-\alpha_o}{16c\pi}\left[\frac{i}{\omega} + \pi\delta(\omega)\right] \exp(i\omega\tau) = \omega \frac{\partial}{\partial \omega}\left[\frac{u_S(\omega)}{\omega^2}\right], \quad \text{Eq. 13}$$

leading to $$\frac{i\alpha_0}{16c\pi}\left[\exp(i\omega\tau)\left\{-\frac{1}{\omega^2} + \frac{i\pi\delta(\omega)}{\omega}\right\}\right] = \frac{\partial}{\partial \omega}\left[\frac{u_S(\omega)}{\omega^2}\right] \quad \text{Eq. 14}$$

Now, the term within the square bracket on L.H.S. of equation (14) can be identified as the Fourier transform of $(t-\tau)H(t-\tau)$ according to Urkowitz (1983). Therefore, $$\frac{i\alpha_0}{16c\pi}(t-\tau)H(t-\tau) \leftrightarrow \frac{\partial}{\partial \omega}\left[\frac{u_S(\omega)}{\omega^2}\right]. \quad \text{Eq. 15}$$

As $h(t) \leftrightarrow h(\omega)$ implies $ith(t) \leftrightarrow \partial h(\omega)/\partial(\omega)$ (Urkowitz, 1983), equation (15) implies $$\frac{i\alpha_0}{(it)16c\pi}(t-\tau)H(t-\tau) \leftrightarrow \frac{u_S(\omega)}{\omega^2}. \quad \text{Eq. 16}$$

The derivative rule, $d^2/dt^2[f(t)] \leftrightarrow -\omega^2 f(\omega)$ (Urkowitz, 1983) renders equation (16) to $$\frac{-\alpha_0}{16c\pi} \frac{d^2}{dt^2}\left[\frac{(t-\tau)H(t-\tau)}{t}\right] \leftrightarrow u_S(\omega). \quad \text{Eq. 17}$$

An immediate consequence of equation (17) is $$u_S(t) = -\frac{\alpha_0}{16c\pi} \frac{d^2}{dt^2}\left[\frac{(t-\tau)H(t-\tau)}{t}\right], \quad \text{Eq. 18}$$

which readily simplifies to $$u_s(t) = -\frac{\alpha_0}{16c\pi}\left[\frac{\delta(t-\tau)}{\tau} - \frac{2\tau H(t-\tau)}{t^3}\right].\qquad\text{Eq. 19}$$

Equation (19), however, is not exact, as its derivation entailed the restriction of Born approximation. The goal, next, is to remove the restriction. It is instructive to note that as $\alpha_0 \to 0$, i.e., when $\alpha_0 = d\alpha$, a first order infinitesimal; the error of approximation is $O((d\alpha)^2)$. Under that circumstance, the plane-wave-reflection coefficient for normal incidence, $$dR = -\frac{d\alpha}{4}\;\text{(Bleistein, 1984)},$$

a relation expected to be correct to first order.

Next, in terms of dR, equation (19) can be rewritten as $$du_s = \frac{dR}{4\pi c}\left[\frac{\delta(t-\tau)}{\tau} - \frac{2\tau H(t-\tau)}{t^3}\right].\qquad\text{Eq. 20}$$

The R.H.S. of the last expression would yield an asymptotic expansion that is indeed the ray expansion containing rays of all orders (Bleistein, 1984). The infinitesimal quantity dR would be the reflection coefficient common to the rays of all orders. The feature of commonness would be true even for a finite reflection coefficient R; because for a point source, an acoustic reflector and a constant density, the reflection coefficients associated with rays of all orders, in the relevant ray expansion, are identical and equal the relevant plane wave reflection coefficient; which, in the present case, is the reflection coefficient for normal incidence, (Bleistein, 1984; Cerveny, 2001). In other words, the asymptotic expansion of the reflection response corresponding to a reflection coefficient, dR would be valid even for a finite reflection coefficient R, provided dR in the first expansion is replaced by R in order to obtain the second. Consequently, for a finite reflection coefficient R, the corresponding $u_s(t)$ and the expression $$\frac{R}{4\pi c}\left[\frac{\delta(t-\tau)}{\tau} - \frac{2\tau H(t-\tau)}{t^3}\right]$$

share the same asymptotic expansion.

The question is whether $$u_s(t) = \frac{R}{4\pi c}\left[\frac{\delta(t-\tau)}{\tau} - \frac{2\tau H(t-\tau)}{t^3}\right]?$$

The answer is in the affirmative because of a causality criterion discussed below. [In general, however, two functions can have identical asymptotic expansions even when they differ by a term whose asymptotic expansion vanishes as $\omega \to \infty$ (Morse and Feshbach, 1953)]. The propagating pulse $u_s(\omega)$ can be synthesized by summing plane-wave-terms proportional to $\exp(i2Kh)$, where $$K = \omega p + i\beta(\omega),\qquad\text{Eq.21}$$

p is the wave slowness and $\beta(\omega)$ an attenuation factor, such that $\exp[-2h\beta(\omega)]$ has a vanishing asymptotic expansion. Consider a vertically propagating plane wave pulse given by $p = 1/c$. The causality condition that the pulse amplitude be zero for $t < 2h/c$, would require that c be a function of $\omega$ and that the propagation involves material attenuation (Aki and Richards, 1980). None of the two requirements are tenable in the propagation model under consideration. Hence, $\beta(\omega)$ in equation (21) must be zero. In other words, $u_s(\omega)$ cannot include a frequency dependent term that is asymptotically vanishing. Therefore, $$u_s(t) = \frac{R}{4\pi c}\left[\frac{\delta(t-\tau)}{\tau} - \frac{2\tau H(t-\tau)}{t^3}\right]\qquad\text{Eq. 22}$$

Recalling that $$\tau = \frac{2h}{c}$$

equation (22) can be rewritten as $$u_s(t) = \frac{R}{8\pi h}\left[\delta(t-\tau) - \frac{2\tau^2 H(t-\tau)}{t^3}\right].\qquad\text{Eq. 23}$$

Consistent with the causality principle the response begins at $t=\tau$, when the impulsive term prevails in the last equation and represents reflection from a point that is the perpendicular projection of the source point on to the reflector. The second term involving the Heaviside function denotes reflections from the points that are away from that projection. In particular, for a time $t_0 (>\tau)$ one can conceive of a circle on the reflector centered at the projection such that each point on the periphery of the circle corresponds to a two-way traveltime of $t_0$ from the source/receiver point to the peripheral point and back. The response at time $t_0$ thus, corresponds to aggregate reflections from all such peripheral points. Further, the aggregate response up to a time, $t=T(>\tau)$ represents the zero-offset reflection response of a circular reflector whose central axis contains the source/receiver point and whose peripheral points correspond to a two-way traveltime, T from the source/receiver point and back. Thus truncating the response in equation (23) at time T has the effect of reducing a reflector of infinite extent to a circular reflector of limited extent with an appropriate radius. An artifact of seismic data acquisition can make the impulse response of a reflector of infinite extent practically indistinguishable from that of a circular reflector, in the following manner. Numerical computations according to equation (23) make it evident that the impulse response of a reflector of infinite extent becomes virtually flat for traveltimes much beyond $\tau$. As a flat segment of the response consists principally of low frequencies absent in a typical seismic wavelet (effective source-time function), the contribution of the flat segment to seismic data would be rather insignificant. The reflection response of a circular reflector computed in the above manner is accurate up to a traveltime T, because the response beyond that time may be contaminated by the diffraction effect from the edge of the circle. If T is large enough such diffraction effect would be of little consequence. The model of a circular reflector can be useful in several ways. First it can represent a geological feature such as the planar top of a dome shaped structure. As argued above, it can serve as a smaller model of a planar reflector of larger extent when the zero-offset response lacks the very low frequencies, as in seismic data. Such a circular reflector can also represent a dipping interface. Then, of course, an upper limit on T (or equivalently on radius of the circular reflector) is imposed by the termination of the interface, possibly at the surface of the earth. Consider a source/receiver point above the interface and the point's perpendicular projection on to the interface. Centered at the projected point, one can conceive of a circle which has a radius equaling the distance to the nearest terminal point of the interface. The two-way traveltime from the source to that terminal point and back constitutes the upper limit on traveltime up to which the response of the interface can be computed exactly. The response, in a strict sense, represents the zero-offset and time-limited reflection from a circular reflector whose center is the perpendicular projection of the source point on to the reflector. In a less restricted sense, though, the response can represent the zero-offset reflection from a dipping interface whose nearest terminal point is relatively far from the perpendicular projection of the source point on to the interface. The following would summarize the foregoing discussion. The impulse response presented in equation (23) decays with time; has, in a strict sense, an infinite time span and possesses a nearly flat tail indicating dominance there of very low frequencies, usually absent in seismic data. In practice one has to truncate the response at some time and discard the tail. The truncated response represents impulse response of a circular reflector whose radius depends on truncation time. Rejection of very low frequencies, as done in acquiring seismic data, also has the effect of discarding the tail and truncating the response. Such truncated impulse response represents, in a strict sense, response of a circular reflector (dipping or horizontal) of a limited extent; and that of a planar reflector of a larger extent (dipping or horizontal) in a less restricted yet accurate sense.

While equation (23) in its entirety represents the complete wave equation response of the reflector, the first term denotes the ray theoretical solution, also called the asymptotic solution (Carcione et al., 2002). This term is often the most significant because of its dominant energy and occurrence as a concentrated burst in time. The second term, in contrast, corresponds to the later part of the response that is diffuse in time and by and large results from the contributions of relatively lower frequencies. The energy of the second term becomes less and less significant with increasing radius of curvature of the incident wavefront at the reflector. If for a certain radius of curvature the effect of the second term is negligible in the reflection response, then for a greater radius of curvature the second term would definitely be negligible.

From the impulse response in equation (23) one can obtain r(t), the zero-offset response of a reflector for a given source function, s(t). Evidently $$r(t)=s(t)*u_s(t) \quad \text{Eq. 24}$$

where * denotes a convolution. Equations (23) and (24) lead to $$r(t) = \frac{R}{8\pi h}\left\{s(t) - 2\tau^2 \cdot s(t)^*\left[\frac{H(t-\tau)}{t^3}\right]\right\} \quad \text{Eq. 25}$$

While equation (23), being an expression for the impulse response of the reflector, constitutes the first key result of the present invention the equation (25) constitutes the second key result. It is worthwhile to restate what each symbol represents in equation (25).

t=two-way traveltime from the source/receiver point to the reflector and back.
r(t)=zero-offset reflection response of a plane reflector due to a point source $$R = \frac{\Delta c}{2c + \Delta c},$$

where c is the wavespeed of the first medium (i.e., the one above the reflector) and c+Δc is the wavespeed of the second medium (i.e., the one below the reflector)
h=perpendicular distance of the reflector from the source/receiver point
s(t)=source-time function
τ=2h/c $$H(t-\tau) = \text{delayed Heaviside function}$$
$$= 1, t > \tau$$
$$= 0, t < \tau$$

If the Heavyside function in equation (25) is truncated at time, T then the response, r(t) will formally correspond to the response of a circular reflector of radius, $(c^2T^2/4-h^2)^{1/2}$; though for a T large enough the response would practically represent the response of a reflector of large spatial extent. As discussed before, the response represents reflection from a reflector (dipping or horizontal) of one of the following types:
  (a) A horizontal reflector of large spatial extent with no terminal points,
  (b) A dipping reflector of large spatial extent but possibly terminating at the surface or subsurface,
  (c) A circular reflector (dipping or horizontal) of radius α [In this case the response is exact up to a travel time, $$T = \frac{2}{c}(a^2 + h^2)^{1/2}\bigg].$$

The response obtained can serve several goals. First it would provide a reference standard against which the reflection response computed by a seismic numerical modeling algorithm can be judged. When a reasonable agreement exists between the two results the algorithm could be designated as validated. An accurate synthetic seismic section can be computed for a dipping or horizontal reflector in the following manner. To compute the synthetic zero-offset seismic section over a dipping reflector one can conceive of many source/receiver points on the earth's surface. For each such point the respective h, the depth to the reflector, is noted. Other relevant parameters involving the reflector such as c, Δc, s(t) are uniform. The equation (25) can then obtain r(t) for each source/receiver location. The ensemble of responses for various source/receiver locations would constitute the synthetic seismic section for a single reflector which is also dipping. For a horizontal reflector, of course, the response remains uniform along the earth's surface and obtaining the response for a single h is enough, as the depth to the reflector remains same for all source/receiver locations. Next, the synthetic section can be the input data for a migration or inversion algorithm. If an algorithm can recover the dipping reflector model initially assumed, then that is treated as validated. The response computable according to equation (25) can validate an interpretation such as the following.

Let, the interpretation of seismic data has led to a planar reflector, dipping or horizontal. Using equation (25) synthetic zero-offset reflection response of the reflector can be computed accurately. This computation can be compared with the observed zero-offset response of the reflector in order to check the extent of agreement between the two. While a satisfactory agreement would validate the interpretation of the geologic feature as a planar reflector, the lack of satisfactory agreement will invalidate the interpretation.

The equations (23) through (25) together yield a method for estimating the seismic source-time function when the zero-offset reflection response of a planar reflector, i.e. r(t) is observed and given. One can deconvolve equation (24) to write $$s(t)=r(t)*u_s^{-1}(t) \qquad \text{Eq. 26}$$

Where $u_s^{-1}(t)$ is the time inverse of $u_s(t)$ such that $$u_s(t)*u_s^{-1}(t)=\delta(t) \qquad \text{Eq. 27}$$

The discrete version of the time inverse can be obtained by the method of least-squares (Robinson and Treitel, 1980). Next, one can obtain s(t) by the digital convolution of the least-squares inverse and the observed array of reflection response data.

Equation (25) can help determine the efficacy of solution by asymptotic method for a given reflection process involving a particular source-time function. The solution by asymptotic method, if efficient, can afford substantial savings in cost of computation. Just as in equation (23), in equation (25), too, the first term denotes the asymptotic or ray-theoretical solution and the second term represents the correction necessary over the asymptotic solution. When the second term has insignificant energy in comparison with the first, the ray-theoretical solution suffices. It was noted earlier that the relative insignificance of the second term grows with the growing radius of curvature of the incident wavefront at the reflector. Further, as the second term primarily represents lower frequencies, its importance is also dependent upon the abundance of lower frequencies in the seismic source-time function (wavelet). Thus, the two determinant factors for the importance of the second term are radius of curvature of the incident wavefront at the reflector and relative abundance of lower frequencies in the source wavelet. If for a given source wavelet the equation (25) yields an insignificant second term for a certain h (i.e. radius of curvature of the incident wavefront at the reflector), then for a greater radius of curvature of the wavefront the second term would be still more insignificant. For a complex geological model one can compute the spreading function between the source and the point of incidence on the reflector by the methods of seismic ray theory (Cerveny and Ravindra, 1971). This spreading function is a good approximation for the radius of curvature of the incident wavefront at the reflector. The spreading function computed for the wavefront incident on the reflector should be substituted for h and the two-way traveltime (from source to reflector and back) for $\tau$ in equation (25) along with information such as reflection coefficient of the reflector and the seismic source function. Next, the relative significance of the contributions of the two terms in equation (25) should be compared. If the contribution of the second term turns out to be insignificant in comparison with that of the first then a ray-theoretical solution is accurate enough for the situation. Resorting to such solution would obviate the use of computationally cumbersome grid methods (Carcione et al., 2002) and thus would afford substantial savings in computational cost.

The flow chart in FIG. 9 describes the essence of the computations outlined above. The branches indicate the options available.

NOVELTY, INVENTIVENESS AND INDUSTRIAL APPLICABILITY OF THE INVENTION

The invented formula as depicted in equation (23) yields a novel method for computing an exact impulse response of a planar reflector at zero offset due to a point acoustic source useful for seismological applications. Such a simple method for computing the aforesaid impulse response did not exist prior to the present invention. By merely varying the parameters c, $\Delta c$, R, h, (the symbols interpreted in accordance with Appendix I) one can compute the impulse response for a wide range of cases. It is impossible to arrive at a result of such exactitude by means of seismic numerical modeling algorithms, which compute reflection response only for smooth source-time functions and not for an impulse function. Equation (25) depicts reflection response for a source-time function of a given description. The precision of the computation according to equation (25) is limited only by the precision of the digital description of s(t) provided. To accomplish a similar accuracy, even the best numerical modeling algorithm would incur a substantial computational cost. Further, unlike in numerical modeling, each of the equations (23) and (25) separately contain the ray theoretical and non-ray theoretical part of the reflection response.

In order to outline the inventive steps, I recall Bleistein (1984) and Bleistein et. al. (1985), who reports an acoustic inversion result that yields the 3-D velocity function when the zero-offset reflection response is available at each point on the surface of the earth.

This general result was specialized to an inversion equation for an 1-D earth and more specifically to the inversion equation for an earth involving a single planar reflector. The first significant step of the breakthrough leading to an exact algebraic formula underlying the present invention lies in viewing the said inversion equation from a reverse perspective, i.e., in viewing the equation as yielding the reflection response when the medium velocities on either side of the reflector and the depth of the reflector from the point source/receiver are known. The second significant step leading to the exact formula involves exact evaluation of an integral by clever uses of established results involving Fourier transform. The third significant step leading to the exact formula consists of removing the restriction of Born approximation common to Bleistein (1984) and Bleistein et al. (1985) by a recourse to ray-theoretical results and results involving causality.

The invention would find utility in modeling reflection of acoustic waves in general and particularly in modeling of reflections in the seismic industry where the earth is often approximated as an acoustic medium (Bleistein, 1984). Seismic numerical modeling is a valuable tool for seismic interpretation and an essential part of seismic inversion algorithms (Carcione et al., 2002). It is mandatory, however, to test the accuracy of a seismic numerical modeling algorithm. Such validation is best carried out by comparing the results of numerical computation against an exact solution. The present invention provides a method for computing an exact solution that can serve as a reference standard against which computed reflection response can be compared and thus, the accuracy of the numerical scheme can be evaluated. Furthermore, the solution, emanating from an algebraic formula, enables easy computation.

Another utility of the present invention lies in assessing the efficacy of a solution obtained by asymptotic method which, though less accurate in comparison with the often-used grid methods, is certainly more efficient and computationally far less cumbersome (Carcione et al., 2002). In certain circumstances, the grid methods offer but an insignificant advantage over the asymptotic method with regard to accuracy. In these situations the dominant part of the wave energy resides in the asymptotic solution making it a preferable choice under the given circumstance. The exact solution afforded by the algebraic formula consists of two terms. The first term represents the asymptotic solution and the second contains the correction over the asymptotic solution. For a given source wavelet (seismic source-time function), it is the radius of curvature of the wavefront at the reflector that decides the relative dominance of the aforesaid two terms. If for a given radius of curvature the second term is insignificant in comparison with the first, then an asymptotic solution can save substantial computational cost and yet yield an accuracy, similar to that offered by the grid methods. Thus, the present invention embodying an exact solution can come handy in determining if the asymptotic solution is sufficiently accurate, and when so the asymptotic solution can afford considerable savings in computational cost.

Still another utility of the present invention would be in computing reflection response of a planar reflector of truncated spatial extent. The response can be exactly computed up to a limited span of time, determined by the following consideration. Consider a source/receiver point above a reflector and its perpendicular projection on to the reflector. Centered at the projected point one can conceive of a circle which has a radius equaling the distance to the nearest terminal point of the reflector. The two-way traveltime from the source to that terminal point and back constitutes the upper limit of observation time up to which the response of a circular reflector can be computed exactly. As a matter of fact, therefore, the response represents the zero-offset and time-limited reflection response of a circular reflector whose center is the perpendicular projection of the source point on to the reflector. The circular reflector can be dipping or horizontal. When dipping, its zero-offset impulse response, limited in observation time as discussed above, will represent the time-limited impulse response of the dipping reflector observed at zero offset. When the time limit is sufficiently large, the response of a circular reflector of limited extent and that of a reflector of infinite extent would practically be indistinguishable in seismic data. This is because the terminal part of the reflection response of a plane reflector of infinite extent is dominated by low frequencies absent in the seismic data. Therefore, for all practical purposes, a circular reflector can serve as a model for a planar reflector of larger extent, whether dipping or horizontal.

Yet another utility of the present invention would be that the zero-offset impulse response of a dipping reflector can be used to obtain synthetic data for testing and validating algorithms for seismic migration and seismic inversion.

A further utility of the present invention lies in validating an interpretation such as the following. Let, the interpretation of seismic data has led to a planar structure. Using the formula of the invention, synthetic zero-offset reflection response of the structure interpreted as a plane reflector, whether dipping or horizontal, can be computed rather accurately. This computation can be compared with the observed zero-offset response in order to check the extent of agreement between the two. While a satisfactory agreement will validate the interpretation of the structure as a plane reflector, whether horizontal or dipping, the lack of a satisfactory agreement will invalidate the interpretation.

Still another utility of the present invention lies in estimating the seismic source-time function when the zero-offset reflection response of a plane reflector, whether horizontal or dipping, is observed and given. If the reflector is known to be plane from the available geological or drilling information, then the seismic source-time function can be estimated by deconvolving the impulse response, derived in the present invention, from the observed zero-offset reflection response.

Definitions of the Symbols Used $u$ = wavefield
$u_I$ = incident wavefield
$u_s(t)$ = scattering response due to an impulse
$v$ = wavespeed
$t$ = wave traveltime
$\delta(t), \delta(x)$ etc. = Dirac delta function (Impulse function)
$c$ = reference wavespeed about which speed perturbation takes place
$\alpha(x)$ = perturbation parameter
$\Delta c$ = change in wavespeed across a reflector
$\alpha_0$ = jump in perturbation parameter across a reflector
$R = \Delta c/(2c + \Delta c)$ = plane-wave-reflection coefficient of a reflector for normal incidence
$r(t)$ = zero-offset reflection response of a plane reflector due to a point source and a given source-time function
$\omega$ = angular frequency
$H$ = Heaviside function
$h$ = depth to the reflector from the source/receiver point
$\tau = 2h/c$
$p$ = wave slowness
$\beta$ = attenuation factor
$K$ = wave number
$T$ = truncation time of the impulse response of a reflector
$a$ = radius of a circular reflector
$u_s^{-1}(t)$ = time inverse of $u_s(t)$, such that $u_s(t) * u_s^{-1}(t) = \delta(t)$ where * denotes a convolution
$s(t)$ = source-time function
$r_{obs}(t)$ = observed zero-offset reflection response of a plane reflector
$S_{est}(t)$ = an estimate of source-time function.

Appendix I: A glossary of the mathematical symbols and their explanations.

The following examples are given by way of illustration and therefore should not be construed to limit the scope of the present invention.

Example 1

This example consists of computing the zero-offset reflection response of a plane reflector due to a point source and a given seismic source-time function. The reflector and its parameters are depicted in FIG. 1 and FIG. 3. The source-time function is represented in FIG. 2. Explicitly, the source-time function, s(t) has representation according to equation $$s(t)=212\exp(-60t).\sin(40\pi t),\qquad\text{Eq. 28}$$

which is a special case of Berlage signal (Cerveny, 2001). Equation (25) is used to compute the reflection response. The functions s(t) and $H(t-\tau)/t^3$ are first digitally represented with a sampling interval of 1 millisecond and then their convolution is computed. The computation of r(t), the zero-offset reflection response is then straightforward following equation (25). This response is depicted in FIG. 3.

The response computed can serve several goals. It would provide a computed standard against which the reflection response computed by a seismic numerical modeling algorithm for the same reflector can be judged. When a satisfactory agreement exists between the two computed results the modeling algorithm can be designated as validated. As outlined earlier, an ensemble of such computations for a varying h can represent a synthetic seismic section over a dipping reflector which in turn can be an input for a seismic inversion/migration algorithm. An agreement between the output reflector model of the algorithm and the initial dipping reflector model would validate the inversion/migration algorithm. Also, as outlined before, such a computation can be an aid in validating an interpretation where seismic data has given rise to a planar reflector.

The time span of the displayed response (FIG. 3) corresponds to an impulse response having a duration of approximately 1.14 seconds. As outlined before, the response, in a strict sense, represents the theoretical reflection response observed at the central axis of a circular reflector of radius ~1680 m. Of course, the circular reflector can be dipping or horizontal with its center lying at a depth of 300 m below the source/receiver point. The fact that the response is flat beyond about 0.6 seconds bears testimony to the statement made earlier regarding flatness of the tail of the response.

The time span of 0.6 seconds corresponds to an impulse response duration of approximately 0.54 seconds. It is trivial to compute that an impulse response of such duration represents the theoretical response observed at the central axis of a circular reflector of radius ~750 m. The theoretical response of a circular reflector of greater radius (or for that matter of a plane reflector of infinite extent) would be little different, as the response in FIG. 3 is virtually insignificant beyond about 0.6 seconds.

Example 2

This example demonstrates the role of equation (25) in identifying a situation when a ray-theoretical solution is accurate enough and when it is not. FIG. 3 represents the complete wave-theoretical solution for a source-reflector (FIG. 1) specified in the caption of FIG. 3 and the source-time function depicted in FIG. 2. FIG. 4 represents the ray-theoretical solution for the same circumstance. FIG. 5 depicts the difference between the wave-theoretical and the ray-theoretical solution. It is evident that the magnitude of the maximum difference is a substantial fraction (~13%) of the maximum of the wave-theoretical solution. Thus, the ray-theoretical solution lacks efficacy in this instance.

FIG. 6 depicts the complete wave-theoretical solution for a point acoustic source-reflector (FIG. 1) specified in the caption of FIG. 6 and the source-time function depicted in FIG. 2. The only difference with the source-reflector parameters specified in FIG. 3 is that h, the depth to the reflector from the source/receiver point, is 1500 m in this case, in contrast with a depth of 300 m as depicted in FIG. 3. FIG. 7 shows the ray-theoretical solution for the circumstance represented in FIG. 6. FIG. 8 depicts the difference between the wave-theoretical and the ray-theoretical solution. It is evident that the magnitude of the maximum difference is only a negligible fraction (~3%) of the maximum of the wave-theoretical solution. Thus, the ray-theoretical solution is adequate in this case. It is important to note that a greater value of h in this case leading to an increased radius of curvature of the incident wavefront at the reflector has made inappreciable the difference between the wave-theoretical and the ray-theoretical solution.

ADVANTAGES OF THE INVENTION

The main advantages of the present invention are:

1. The invention provides a method for computing an exact impulse response of a plane acoustic reflector at zero offset due to a point acoustic source representing the complete wave-theoretical solution.

2. An exact algebraic formula for the impulse response of a plane acoustic reflector at zero offset due to a point acoustic source, specifically derived to serve as a basis for the invention, underlies the above-mentioned method and readily lends itself to easy computation, doing away with the formidable computations required in either the numerical evaluation of integrals or other numerical techniques for solution.

3. The formula provides the impulse response which includes the response for all frequencies and in which the impulse lends itself to modification to any source-time function, the response for which is obtainable by convolution.

The formula contains two distinct terms, the first, i.e., $$\frac{R}{8\pi h}\delta(t-\tau)$$

representing the ray-theoretical solution and the second, i.e., $$\frac{R}{8\pi h}\left[-\frac{2\tau^2 H(t-\tau)}{t^3}\right]$$

representing the non-raytheoretical solution, rendering assessment of the relative importance of the two terms rather easy.

4. The zero-offset response due to a point source as yielded by the formula mimics the presentation of seismic sections in a zero-offset mode, the similarity paving the way for a ready comparison between the two.

5. The formula easily lends itself to exact computation of the seismic section for a dipping reflector.

6. The formula provides a method for computing exact zero-offset reflection response of a circular reflector observed at its central axis and up to a limited span of time.

REFERENCES

Aki, K. and Richards, P. G., 1980, Quantitative Seismology, W.H. Freeman and Co., San Francisco.

Bleistein, N., 1984, Mathematical Methods for Wave Phenomena, Academic Press, New York.

Bleistein, N., Cohen, J. K. and Hagin, F. G., 1985. "Computational and Asymptotic Aspects of Velocity Inversion" Geophysics, vol. 50, pp 1253-1265.

Cagniard, L., 1939, Reflexion et Refraction des Ondes Seismiques Progressives, Gauthier-Villars, Paris.

Carcione, J. M., Herman, G. C. and ten Kroode, A. P. E., 2002, "Seismic Modeling", Geophysics, vol. 67, pp 1304-1325.

Cerveny, V., 2001, Seismic Ray Theory, Cambridge University Press, Cambridge.

Cerveny, V. and Ravindra, R., 1971, Theory of Seismic Head Waves, University of Toronto Press, Toronto.

Claerbout, J. F., 1985, Imaging the Earth's Interior, Blackwell Scientific Publications, Oxford.

de Hoop, A. T., 1960, "A Modification of Cagniard's Method for Solving Seismic Pulse Problems", Applied Science Research, B8, 349-56.

Hilterman, F. J., 1975, "Amplitudes of Seismic Waves—a Quick Look", Geophysics, vol. 40, pp 745-762.

Morse, P. M. and Feshbach, H., 1953, Methods of Theoretical Physics, vol. 1, McGraw-Hill, New York.

Robinson, E. A. and Treitel, S., 1980, Geophysical Signal Analysis, Prentice-Hall Inc., Englewood Cliffs.

Urkowitz, H., 1983, Signal Theory and Random Processes, Artech House Inc., Dedham.

What is claimed is:

1. A method for determining impulse response [$u_s(t)$] and reflection response [$r(t)$] of a plane acoustic reflector at zero offset, due to a point acoustic source by varying parameters consisting of reference wave speed about which speed perturbation takes place (c), change in wave speed across a reflector ($\Delta c$), plane-wave-reflection coefficient of a reflector for normal incidence (R), depth to the reflector from the source/receiver point (h) and source time function s(t), employing Fourier method, wherein perturbation parameter is substituted in terms of reference wave speed and change in wave speed at an infinite plane interface across which the wave speed changes from the reference wave speed to a sum of the reference wave speed and the change in wave speed, followed by removing the restrictions of Born approximation, the method being useful for seismological applications, the method comprising the steps of:

i) inputting distance of the reflector (h), reference wave speed (c), change in wave speed ($\Delta c$), source time function s(t) and truncation time of the impulse response of a reflector (T) in equation A:

$$u_s(t) = R/8\pi h[\delta(t-\check{c}) - 2\check{c}^2 H(t-\check{c})/t^3] \quad \text{(Equation A)};$$

ii) obtaining impulse response $u_S(t)$ of a plane acoustic reflector at zero offset due to a point acoustic source according to $$u_s(t) = R/8\pi h[\delta(t-\check{c}) - 2\check{c}^2 H(t-\check{c})/t^3],$$

wherein:
  $R = \Delta c/(2c+\Delta c)$;
  t=observation time that begins at the onset of the source;
  $\delta(t)$=Dirac delta function;
  c=Reference wave speed;
  $\Delta c$=change in wave speed;
  h=shortest distance between the source and the reflector;
  $\check{c} = 2h/c$;
  H=Heaviside function, denoted by H($t-\check{c}$) and is defined as $$H(t-\check{c}) = 1, t > \check{c} = 0, t < \check{c}$$

iii) obtaining reflection response [r(t)] of a plane acoustic reflector at zero offset due to a point acoustic source described by source time function s (t), from the expression as obtained in Equation B:

$$r(t) = R/8\pi h\{s(t) - 2\check{c}^2 s(t) * [H(t-\check{c})/t^3]\} \quad \text{(Equation B)};$$

wherein:
  $R = \Delta c/(2c+\Delta c)$;
  $\check{c} = 2h/c$; and * denotes convolution;
  H=Heaviside function;
  t=observation time that begins at the onset of the source;
  s(t)=source time function;
  c=Reference wave speed;
  $\Delta c$=change in wave speed; and
  h=shortest distance between the source and the reflector, wherein a visualization of the transformed data is output.

2. A method for computing the impulse response [$u_s(t)$] and reflection response [r(t)] of a plane acoustic reflector as claimed in claim 1 wherein, the zero-offset reflection response of circular reflector is computed considering observations at its central axis and up to a limited span of time.

3. A method for computing the impulse response [$u_s(t)$] and reflection response [r(t)] of a plane acoustic reflector as claimed in claim 1 wherein, the accurate zero-offset seismic section is computed due to a dipping or horizontal planar reflector to validate seismic migration and inversion algorithms.

4. A method for computing the impulse response [$u_s(t)$] and reflection response [r(t)] of a plane acoustic reflector as claimed in claim 1, wherein the said method validates an interpretation of a reflector as a planar structure.

5. A method for computing the impulse response [$u_s(t)$] and reflection response [r(t)] of a plane acoustic reflector as claimed in claim 1, wherein the said method computes the seismic source time function s(t) by inputting the zero-offset reflection response of a plane reflector.

* * * * *